US006988186B2

(12) United States Patent
Eickemeyer et al.

(10) Patent No.: US 6,988,186 B2
(45) Date of Patent: Jan. 17, 2006

(54) SHARED RESOURCE QUEUE FOR SIMULTANEOUS MULTITHREADING PROCESSING WHEREIN ENTRIES ALLOCATED TO DIFFERENT THREADS ARE CAPABLE OF BEING INTERSPERSED AMONG EACH OTHER AND A HEAD POINTER FOR ONE THREAD IS CAPABLE OF WRAPPING AROUND ITS OWN TAIL IN ORDER TO ACCESS A FREE ENTRY

(75) Inventors: Richard James Eickemeyer, Rochester, MN (US); Steven R. Kunkel, Rochester, MN (US); Hung Q Le, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 399 days.

(21) Appl. No.: 09/894,260

(22) Filed: Jun. 28, 2001

(65) Prior Publication Data

US 2003/0005263 A1    Jan. 2, 2003

(51) Int. Cl.
     G06F 15/167     (2006.01)
(52) U.S. Cl. .................................... 712/217; 712/228
(58) Field of Classification Search .......... 712/21–219, 712/235, 228; 718/100, 104; 710/52–57
     See application file for complete search history.

(56) References Cited

U.S. PATENT DOCUMENTS

| | | | | |
|---|---|---|---|---|
| 5,465,120 A | * | 11/1995 | Schultheiss | 348/716 |
| 5,623,608 A | * | 4/1997 | Ng | 711/137 |
| 6,075,931 A | * | 6/2000 | Panwar | 716/1 |
| 6,311,261 B1 | * | 10/2001 | Chamdani et al. | 712/23 |
| 6,353,829 B1 | * | 3/2002 | Koblenz et al. | 707/100 |
| 6,507,921 B1 | * | 1/2003 | Buser et al. | 714/45 |
| 6,629,271 B1 | * | 9/2003 | Lee et al. | 714/49 |
| 2001/0032307 A1 | * | 10/2001 | Rohlman et al. | 712/219 |
| 2002/0078317 A1 | * | 6/2002 | Yasoshima | 711/171 |
| 2003/0061258 A1 | * | 3/2003 | Rodgers et al. | 709/102 |
| 2003/0105944 A1 | * | 6/2003 | Emer et al. | 712/220 |

OTHER PUBLICATIONS

Gulati, M., Bagherzadeh, N. "Performance Study of a Multithreaded Superscaler Microprocessor". Proc. of the 2 nd International Symposium on High-Performance Computer Architectures, Feb. 1996, 291-301.*

(Continued)

*Primary Examiner*—Eddie Chan
*Assistant Examiner*—Aimee J. Li
(74) *Attorney, Agent, or Firm*—Karuna Ojanen

(57) ABSTRACT

A queue, such as a first-in first-out queue, is incorporated into a processing device, such as a multithreaded pipeline processor. The queue may store the resources of more than one thread in the processing device such that the entries of one thread may be interspersed among the entries of another thread. The entries of each thread may be identified by a thread identification, a valid marker to indicate if the resources within the entry are valid, and a bank number. For a particular thread, the bank number tracks the number of times a head pointer pertaining to the first entry has passed a tail pointer. In this fashion, empty entries may be used and the resources may be efficiently allocated. In a preferred embodiment, the shared resource queue may be implemented into an in-order multithreaded pipelined processor as a queue storing resources to be dispatched for execution of instructions. The shared resource queue may also be implemented into a branch information queue or into any queue where more than one thread may require dynamic registers.

12 Claims, 12 Drawing Sheets

OTHER PUBLICATIONS

Ponomarev, D., Kucuk, G., Ghose, K., "Dynamic Allocation of Datapath Resources for Low Power", in Proc. of Workshop on Complexity-Effective Design, held in conjunction with ISCA-28, Jun. 2001.*

Daniele Folegnani, Antonio González, "Energy-effective issue logic", Proceedings of the 28th annual international symposium on Computer architecture, p. 230-239, Jun. 30-Jul. 4, 2001, Göteborg, Sweden.*

S. Reinhardt and S. Mukherjee, "Transient fault detection via simultaneous multithreading" 27th Int'l Symp. on Computer Architecture, Jun. 2000.*

U.S. Appl. No. 09/108,160 entitled System and Method for Dispatching Groups of Instructions, filed Jun. 30, 1998.

U.S. Appl. No. 09/213,323 entitled System and Method for Permitting Out-of-Order Execution of Load Instructions, filed Dec. 16, 1998.

U.S. Appl. No. 09/213,331 entitled System and Method for Permitting Out-of-Order Execution of Load and Store Instructions, filed Dec. 16, 1998.

U.S. Appl. No. 09/332,413 entitled Method and System for Restoring a Processor State Within a Data Processing System in which instructions are Tracked in Groups, filed Jul. 14, 1999.

U.S. Appl. No. 09/434,095 entitled System and Method for Managing the Execution of Instruction Groups Having Multiple Executable Instructions, filed Nov. 5, 1999.

U.S. Appl. No. 09/564,930 entitled Selective Flush of Shared and Other Pipelined Stages in a Multithreaded Processor, filed May 4, 2000.

U.S. Appl. No. 09/645,08 entitled Method for Implementing a Variable-Partitioned Queue for Simultaneous Multithreaded Processors, filed Aug. 24, 2000.

* cited by examiner

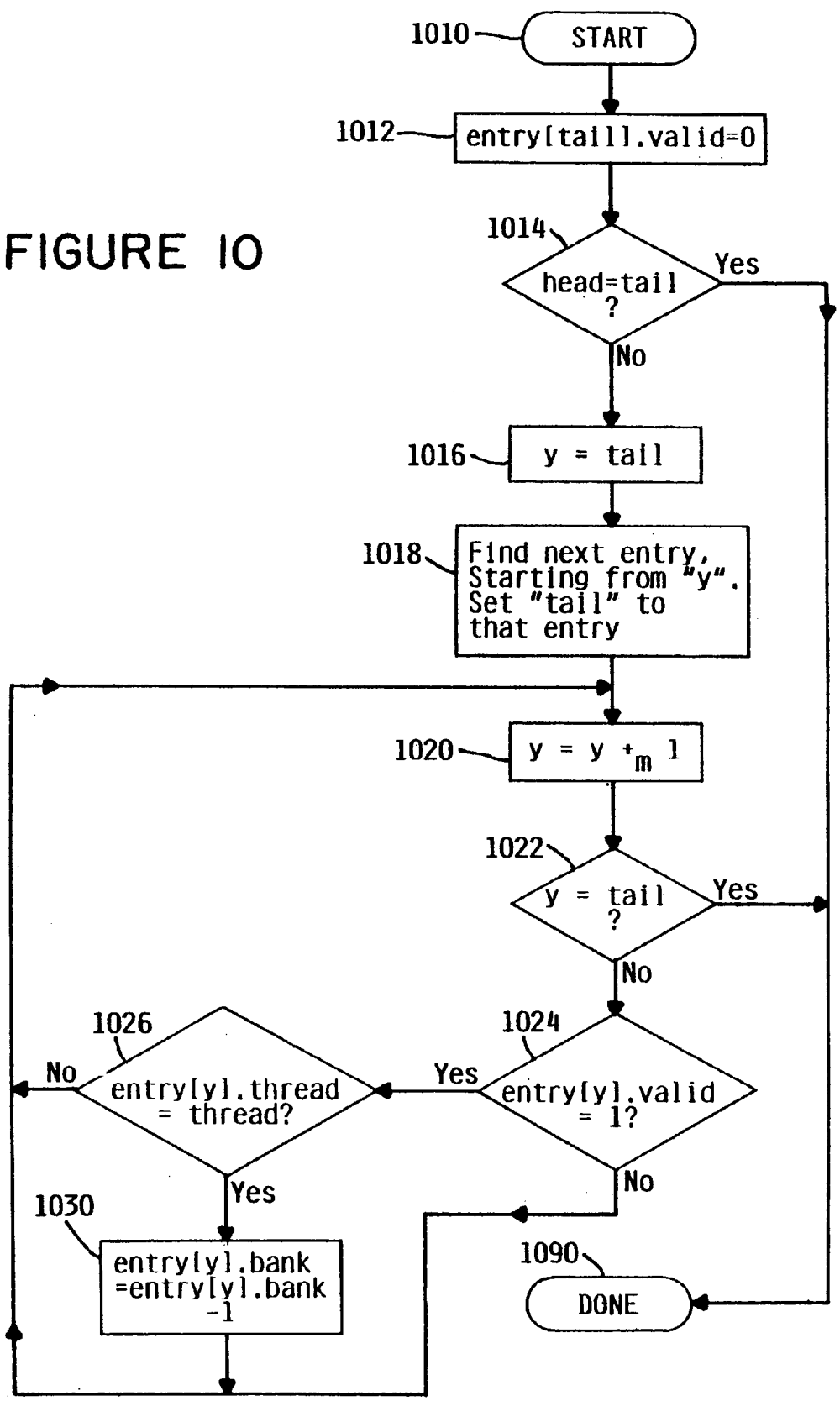

SHARED RESOURCE QUEUE FOR SIMULTANEOUS MULTITHREADING PROCESSING WHEREIN ENTRIES ALLOCATED TO DIFFERENT THREADS ARE CAPABLE OF BEING INTERSPERSED AMONG EACH OTHER AND A HEAD POINTER FOR ONE THREAD IS CAPABLE OF WRAPPING AROUND ITS OWN TAIL IN ORDER TO ACCESS A FREE ENTRY

TECHNICAL FIELD

The present invention relates in general to an improved data processor architecture and in particular to a queue within the processor core to support simultaneous hardware multithreading.

BACKGROUND OF THE INVENTION

From the standpoint of the computer's hardware, most systems operate in fundamentally the same manner. Computer processors actually perform very simple operations quickly, such as arithmetic, logical comparisons, and movement of data from one location to another. What is perceived by the user as a new or improved capability of a computer system, however, may actually be the machine performing the same simple operations at very high speeds. Continuing improvements to computer systems require that these processor systems be made ever faster.

One measurement of the overall speed of a computer system, also called the throughput, is measured as the number of operations performed per unit of time. Conceptually, the simplest of all possible improvements to system speed is to increase the clock speeds of the various components, particularly the clock speed of the processor. So that if everything runs twice as fast but otherwise works in exactly the same manner, the system will perform a given task in half the time. Computer processors which were constructed from discrete components years ago performed significantly faster reducing the size and number of components; eventually the entire processor was packaged as an integrated circuit on a single chip. The reduced size made it possible to increase the clock speed of the processor, and accordingly increase system speed.

Despite the enormous improvement in speed obtained from integrated circuitry, the demand for ever faster computer systems still exists. Hardware designers have been able to obtain still further improvements in speed by greater integration, by further reducing the size of the circuits, and by other techniques. Designers, however, think that physical size reductions cannot continue indefinitely and there are limits to continually increasing processor clock speeds. Attention has therefore been directed to other approaches for further improvements in overall throughput of the computer system.

Without changing the clock speed, it is still possible to improve system speed by using multiple processors. The modest cost of individual processors packaged on integrated circuit chips has made this practical. The use of slave processors considerably improves system speed by off-loading work from the central processing unit (CPU) to the slave processor. For instance, slave processors routinely execute repetitive and single special purpose programs, such as input/output device communications and control. It is also possible for multiple CPUs to be placed in a single computer system, typically a host-based system which serves multiple users simultaneously. Each of the different CPUs can separately execute a different task on behalf of a different user, thus increasing the overall speed of the system to execute multiple tasks simultaneously.

Coordinating the execution and delivery of results of various functions among multiple CPUs is a tricky business; not so much for slave I/O processors because their functions are pre-defined and limited but it is much more difficult to coordinate functions for multiple CPUs executing general purpose application programs. System designers often do not know the details of the programs in advance. Most application programs follow a single path or flow of steps performed by the processor. While it is sometimes possible to break up this single path into multiple parallel paths, a universal application for doing so is still being researched. Generally, breaking a lengthy task into smaller tasks for parallel processing by multiple processors is done by a software engineer writing code on a case-by-case basis. This ad hoc approach is especially problematic for executing commercial transactions which are not necessarily repetitive or predictable.

Thus, while multiple processors improve overall system performance, it is much more difficult to improve the speed at which a single task, such as an application program, executes. If the CPU clock speed is given, it is possible to further increase the speed of the CPU, i.e., the number of operations executed per second, by increasing the average number of operations executed per clock cycle. A common architecture for high performance, single-chip microprocessors is the reduced instruction set computer (RISC) architecture characterized by a small simplified set of frequently used instructions for rapid execution, those simple operations performed quickly as mentioned earlier. As semiconductor technology has advanced, the goal of RISC architecture has been to develop processors capable of executing one or more instructions on each clock cycle of the machine. Another approach to increase the average number of operations executed per clock cycle is to modify the hardware within the CPU. This throughput measure, clock cycles per instruction, is commonly used to characterize architectures for high performance processors.

Processor architectural concepts pioneered in high performance vector processors and mainframe computers of the 1970s, such as the CDC-6600 and Cray-1, are appearing in RISC microprocessors. Early RISC machines were very simple single-chip processors. As Very Large Scale Integrated (VLSI) technology improves, additional space becomes available on a semiconductor chip. Rather than increase the complexity of a processor architecture, most designers have decided to use the additional space to implement techniques to improve the execution of a single CPU. Two principal techniques utilized are on-chip caches and instruction pipelines. Cache memories store data that is frequently used near the processor and allow instruction execution to continue, in most cases, without waiting the full access time of a main memory. Some improvement has also been demonstrated with multiple execution units with hardware that speculatively looks ahead to find instructions to execute in parallel. Pipeline instruction execution allows subsequent instructions to begin execution before previously issued instructions have finished.

The superscalar processor is an example of a pipeline processor. The performance of a conventional RISC processor can be further increased in the superscalar computer and the Very Long Instruction Word (VLIW) computer, both of which execute more than one instruction in parallel per processor cycle. In these architectures, multiple functional or execution units are connected in parallel to run multiple pipelines. The name implies that these processors are scalar processors capable of executing more than one instruction in each cycle. The elements of superscalar pipelined execution may include an instruction fetch unit to fetch more than one instruction at a time from a cache memory, instruction decoding logic to determine if instructions are independent and can be executed simultaneously, and sufficient execution units to execute several instructions at one time. The execution units may also be pipelined, e.g., floating point adders or multipliers may have a cycle time for each execution stage that matches the cycle times for the fetch and decode stages.

In a superscalar architecture, instructions may be completed in-order and/or out-of-order. In-order completion means no instruction can complete before all instructions dispatched ahead of it have been completed. Out-of-order completion means that an instruction is allowed to complete before all instructions ahead of it have been completed, as long as a predefined rules are satisfied. Within a pipelined superscalar processor, instructions are first fetched, decoded and then buffered. Instructions can be dispatched to execution units as resources and operands become available. Additionally, instructions can be fetched and dispatched speculatively based on predictions about branches taken. The result is a pool of instructions in varying stages of execution, none of which have completed by writing final results. These instructions in different stages of interim execution may be stored in a variety of queues used to maintain the in-order appearance of execution. As resources become available and branches are resolved, the instructions are retrieved from their respective queue and "retired" in program order thus preserving the appearance of a machine that executes the instructions in program order.

Another technique called hardware multithreading independently executes smaller sequences of instructions called threads or contexts in a single processor. When a CPU, for any of a number of reasons, stalls and cannot continue processing or executing one of these threads, it switches to and executes another thread. The term "multithreading" as defined in the computer architecture community is not the same as the software use of the term in which one task is subdivided into multiple related threads. Software multithreading substantially involves the operating system which manipulates and saves data from registers to main memory and maintains the program order of related and dependent instructions before switching tasks. Software multithreading does not require nor is it concerned with hardware multithreading and vice versa. Hardware multithreading manipulates hardware architected registers and execution units and pipelined processors within the processor core to maintain the state of one or more independently executing sets of instructions, called threads, in the processor hardware. Threads could be derived from, for example, different tasks in a multitasking system, different threads compiled from a software multithreading system, or from different I/O processors. What makes hardware multithreading unique and different from all these systems, however, is that more than one thread is independently maintained in a processor's registers.

Hardware multithreading takes on a myriad of forms. Multithreading permits processors having either non-pipelined or pipelined architectures to do useful work on more than one thread in the processor's registers. One form of multithreading, sometimes referred to as coarse-grained multithreading, is to execute one thread until the executing thread experiences a long latency event, such as retrieving data and/or instructions from memory or a processor interrupt, etc. Fine-grained multithreading, on the other hand, interleaves or switches threads on a cycle-by-cycle basis. Simultaneous hardware multithreading maintains N threads, or N states, in parallel in the processor and simultaneously executes N threads in parallel. Replicating processor registers for each of N threads results in some of the following registers being replicated N times: general purpose registers, floating point registers, condition registers, floating point status and control registers, count registers, link registers, exception registers, save/restore registers, special purpose registers, etc. Special buffers, such as a segment lookaside buffer, may be replicated but if not, each entry can be tagged with the thread number and flushed on every thread switch. Also, some branch prediction mechanisms, e.g., the correlation register and the return stack, may also be replicated.

Multithreading may also take on features of one or all of the forms, picking and choosing particular features for particular attributes. Not all of the processor's features need be replicated for each thread and there may be some shared and some replicated registers. Stages in the pipeline may either be separate or shared. Preferably, there may be no need to replicate some of the larger functions of the processor such as the level one instruction cache, level one data cache, instruction buffer, store queue, instruction dispatcher, functional or execution units, pipelines, translation lookaside buffer (TLB), and branch history table.

With respect to the threads there may be private or separate resources, or shared resources. Private resources simplify the management in that pointers from different threads address different data structures and may permit advantageous placement of the queues in different parts of the chip. Some private resources are registers or queues dedicated for the exclusive use of a particular thread. Another example of a private resource may be a split queue or registers having reserved spaces for each thread. An example of a partitioned queue is set forth in U.S. patent application Ser. No. 09/645,081 filed 24 Aug. 2000 entitled Method for Implementing a Variable-Partitioned Queue for Simultaneous Multithreaded Processors, which application is owned by the assignee herein and which is hereby incorporated by reference in its entirety.

The combination of out-of-order processing with simultaneous multithreading reveal some of the classical dilemmas of processor architecture and design. In order to proceed quickly, each thread may maintain its own out-of order queues of instructions in varying stages of completion, i.e., have its own private resources. Yet, the additional resources required for each thread are expensive and may be cumbersome in terms of space and power. Separate resources, moreover, lack the flexibility required for dynamic simultaneous multithreading. Execution of a thread of high priority, for example, may demand significantly more hardware registers and queues and other resources than has been architected for a single thread. Conversely, a different thread may not utilize all the space it has been allotted and so there are wasted resources. The partitioned queues as above lack the spontaneous flexibility and responsiveness that may be required by simultaneous multithreading.

In accordance with a preferred embodiment of the invention, the use of shared resources for the various queue yields performance benefits similar to the split queue structure without increasing the chip area over the split queue case. But, normally shared resources present their own set of problems. If no dispatch flush can be performed on a shared resource, processing is stalled because the shared resource, such as the register renamed pool, is full or otherwise blocked. Under these circumstances all threads are blocked such that no processing of any thread can occur and either a normal flush would occur or the processor would wait until the stalling condition is resolved. To complicate matters even further, there are certain conditions under which a dispatch flush cannot occur, such as when the stalled instruction is of a group of instructions generated from a decoded multiple or more complex instruction but the stalled instruction is not the first of the group.

There is thus a need to accommodate dynamic out-of-order processing of multiple threads in a processor architecture.

SUMMARY OF THE INVENTION

These needs and others that will become apparent to one skilled in the art are satisfied by a resource queue, comprising: a plurality of entries, each entry having unique resources required for information processing in which the plurality of entries is allocated amongst a plurality of independent hardware threads such that the resources of more than one thread may be within the queue and the entries allocated to one thread may be interspersed among the entries allocated to another thread.

The first entry of one thread may wrap around the last entry of the same thread. Each thread may have a head pointer and a tail pointer wherein the head pointer is the first entry of the thread and the tail pointer is the last entry of the thread, and one of the unique resources is a bank number to indicate how many times the head pointer has wrapped around the tail pointer in order to maintain an order of the resources for the thread. There may also be a free pointer for a thread indicating an entry in the queue available for resources of the at least one thread.

The information processing may occur within an out-of-order computer processor, and the resource queue may further comprise a load reorder queue and/or a store reorder queue and/or a global completion table and or a branch information queue.

The invention may also be considered a resource queue in an out-of-order multithreaded computer processor, comprising: a load reorder queue; a store reorder queue; a global completion table; a branch information queue, wherein at least one of the queues comprises: a plurality of entries, each entry having unique resources required for information processing; the plurality of entries allocated amongst a plurality of independent hardware threads such that the resources of more than one thread may be within the queue; and the entries allocated to one thread may be interspersed among the entries allocated to another thread; and a first entry of one thread being capable of wrapping around the last entry of the same thread; and at least one thread having a head pointer and a tail pointer wherein the head pointer is the first entry of the thread and the tail pointer is the last entry of the thread, and a bank number indicates how many times the head pointer has wrapped around the tail pointer; and at least one free pointer for the at least one thread indicating an entry in the queue is available for resources of the thread.

The invention is also a method of allocating a shared resource queue for multithreaded electronic data processing, comprising the steps of determining if the shared resource queue is empty for a particular thread; finding the first entry of a particular thread; determining if the first entry and a free entry of the particular thread are the same; if, not advancing the first entry to the free entry; incrementing a bank number if the first entry passes the last entry before it finds the free entry; and allocating the next free entry by storing resources for the particular thread.

The method may further comprise deallocating multithreaded resources in the shared resource queue, comprising the steps of locating the last entry in the shared resource queue pertaining to the particular thread; determining if the last entry is also the first entry for the particular thread; if not, finding the next entry pertaining to the particular thread; determining if the bank number of the next entry is the same as the last entry and if so, deallocating the next entry by marking the resources as invalid; and if not, then skipping over the next entry and decrementing the bank number; and finding the next previous entry pertaining to the particular thread.

The shared resource queue may also be flushed by setting a flush point indicative of an oldest entry to be deallocated pertaining to the particular thread, and invalidating all entries between the head pointer and the flush point which have the same and greater bank number than the bank number of the flush point.

The invention is also considered a shared resource mechanism in a hardware multithreaded pipeline processor, the pipeline processor simultaneously processing a plurality of threads, the shared resource mechanism comprising: a dispatch stage of the pipeline processor; at least one shared resource queue connected to the dispatch stage; dispatch control logic connected to the dispatch stage and to at least one shared resource queue; and an issue queue of the pipeline processor connected to the dispatch stage and to the at least one shared resource queue, wherein the at least one shared resource queue allocates and deallocates resources for at least two threads passing into the issue queues in response to the dispatch control logic.

The invention is also an apparatus to enhance processor efficiency, comprising: means to fetch instructions from a plurality of threads into a hardware multithreaded pipeline processor; means to distinguish the instructions into one of a plurality of threads; means to decode the instructions; means to allocate a plurality of entries in at least one shared resource between at least two of the plurality of threads; means to determine if the instructions have sufficient private resources and at least one shared resource queue for dispatching the instructions; means to dispatch the instructions; means to deallocate the entries in the shared resource when one of the threads are dispatched; means to execute the instructions and the resources for the one of the threads. The apparatus may further comprises a means to flush the shared resource of all of the entries pertaining to a particular thread.

The invention is also a computer processing system, comprising: a central processing unit; a semiconductor memory unit attached to the central processing unit; at least one memory drive capable of having removable memory; a keyboard/pointing device controller attached to the central processing unit for attachment to a keyboard and/or a pointing device for a user to interact with the computer processing system; a plurality of adapters connected to the central processing unit to connect to at least one input/output device for purposes of communicating with other computers, networks, peripheral devices, and display devices; a hardware multithreading pipelined processor within the central processing unit to process at least two independent threads of execution, the pipelined processor comprising a fetch stage, a decode stage, and a dispatch stage; and at least one shared resource queue within the central processing unit, the shared resource queue having a plurality of entries pertaining to more than one thread in which entries pertaining to different threads are interspersed among each other. In addition, a first entry of one thread may be located after a last entry of the one thread. Further, the hardware multithreaded pipelined processor in the central processing unit may be an out-of-order processor.

The invention is best understood with reference the Drawing and the detailed description of the invention which follows.

BRIEF DESCRIPTION OF THE DRAWING

FIG. 10 is a simplified flow chart of a method to deallocate an entry in a shared resource to a particular thread in accordance with a feature of the invention.

DETAILED DESCRIPTION OF THE INVENTION

Figure 1:
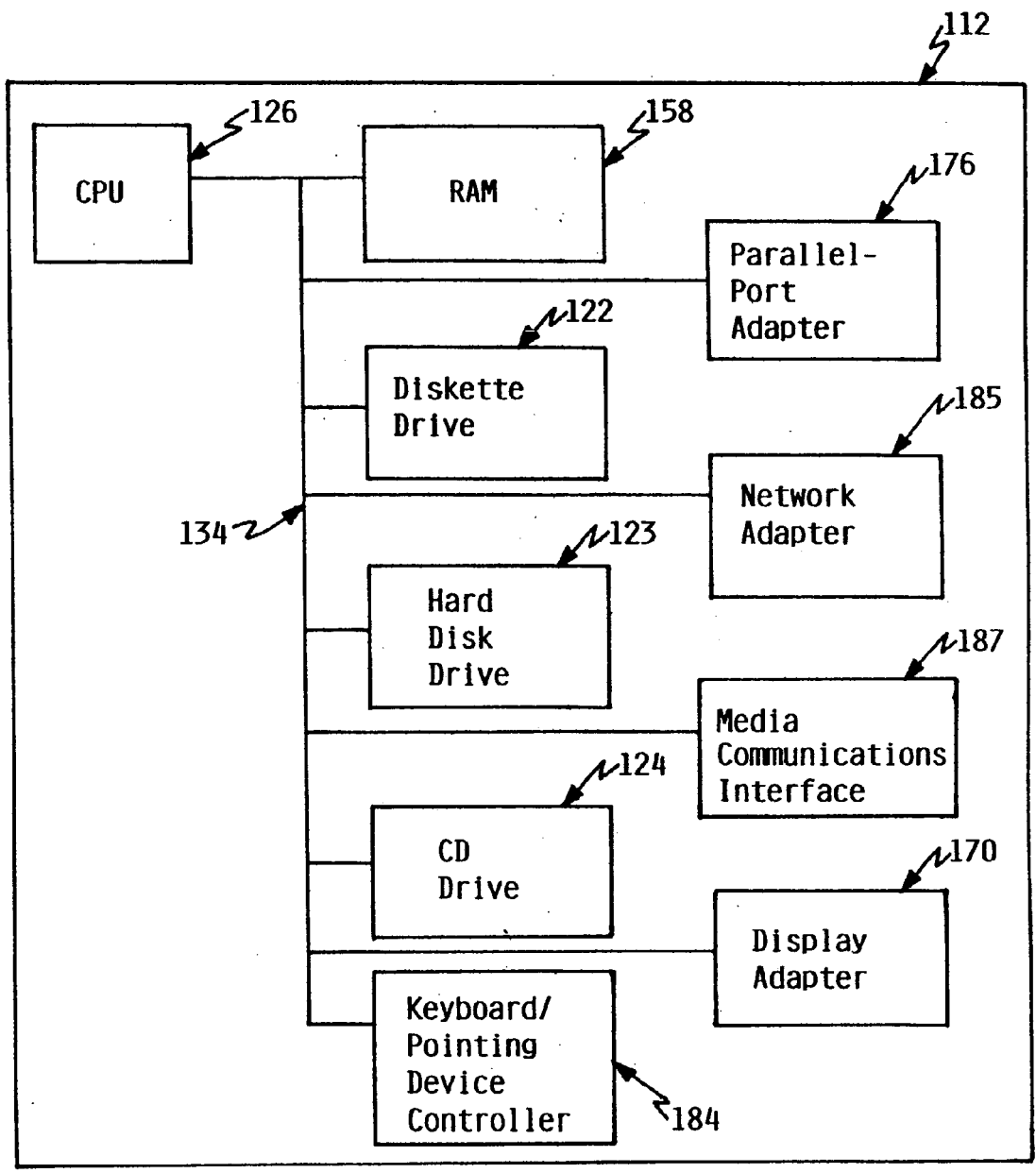
FIG. 1 is a simplified block diagram of a computer that can be used in accordance with an embodiment of the invention.

Referring now to the Drawing wherein like numerals refer to the same or similar elements throughout and in particular with reference to FIG. 1, there is depicted a block diagram of the principal components of a processing unit 112, central processing unit (CPU) 126 may be connected via system bus 134 to RAM 158, diskette drive 122, hard-disk drive 123, CD drive 124, keyboard/pointing-device controller 184, parallel-port adapter 176, network adapter 185, display adapter 170 and media communications adapter 187. Internal communications bus 134 supports transfer of data, commands and other information between different devices; while shown in simplified form as a single bus, it is typically structured as multiple buses; and may be arranged in a hierarchical form.

CPU 126 is a general-purpose programmable multithreaded processor, executing instructions stored in memory 158. While a single CPU having multithreaded capabilities is shown in FIG. 1, it should be understood that computer systems having multiple CPUs, some of which may not have multithreaded capabilities, are common in servers and can be used in accordance with principles of the invention so long as one CPU has multithreading capabilities. Although the other various components of FIG. 1 are drawn as single entities, it is also more common that each consist of a plurality of entities and exist at multiple levels. While any appropriate multithreaded processor can be utilized for CPU 126, it is preferably one of the PowerPC™ line of microprocessors available from IBM having simultaneous multithreading capabilities. Processing unit 112 with CPU 126 may be implemented in a computer, such as an IBM pSeries or an IBM iSeries computer running the AIX or other operating system. CPU 126 accesses data and instructions from and stores data to volatile random access memory (RAM) 158. CPU 126 is suitably programmed to carry out the preferred embodiment as described in more detail in the flowcharts of FIGS. 5–11B.

Memory 158 is a random-access semiconductor memory (RAM) for storing data and programs; memory is shown conceptually as a single monolithic entity, it being understood that memory is often arranged in a hierarchy of caches and other memory devices. RAM 158 typically comprises a number of individual volatile memory modules that store segments of operating system and application software while power is supplied to processing unit 112. The software segments may be partitioned into one or more virtual memory pages that each contain a uniform number of virtual memory addresses. When the execution of software requires more pages of virtual memory than can be stored within RAM 158, pages that are not currently needed are swapped with the required pages, which are stored within non-volatile storage devices 122, 123, or 124. Data storage 123 and 124 preferably comprise one or more rotating magnetic or optical hard disk drive units, although other types of data storage could be used.

Keyboard/pointing-device controller 184 interfaces processing unit 112 with a keyboard and graphical pointing device. In an alternative embodiment, there may be a separate controller for the keyboard and the graphical pointing device and/or other input devices may be supported, such as microphones, voice response units, etc. Display device adapter 170 translates data from CPU 126 into video, audio, or other signals utilized to drive a display or other output device. Device adapter 170 may support the attachment of a single or multiple terminals, and may be implemented as one or multiple electronic circuit cards or other units.

Processing unit 112 may include network-adapter 185, media communications interface 187, and parallel-port adapter 176, all of which facilitate communication between processing unit 112 and peripheral devices or other data processing system. Parallel port adapter 176 may transmit printer-control signals to a printer through a parallel port. Network-adapter 185 may connect processing unit 112 to a local area network (LAN). A LAN provides a user of processing unit 112 with a means of electronically communicating information, including software, with a remote computer or a network logical storage device. In addition, a LAN supports distributed processing which enables processing unit 112 to share a task with other data processing systems linked to the LAN. For example, processing unit 112 may be connected to a local server computer system via a LAN using an Ethernet, Token Ring, or other protocol, the server in turn being connected to the Internet. Media communications interface 187 may comprise a modem connected to a telephone line or other higher bandwidth interfaces through which an Internet access provider or on-line service provider is reached. Media communications interface 187 may interface with cable television, wireless communications, or high bandwidth communications lines and other types of connection. An on-line service may provide software that can be downloaded into processing unit 112 via media communications interface 187. Furthermore, through the media communications interface 187, processing unit 112 can access other sources of software such as a server, electronic mail, or an electronic bulletin board, and the Internet or world wide web.

Figure 2:
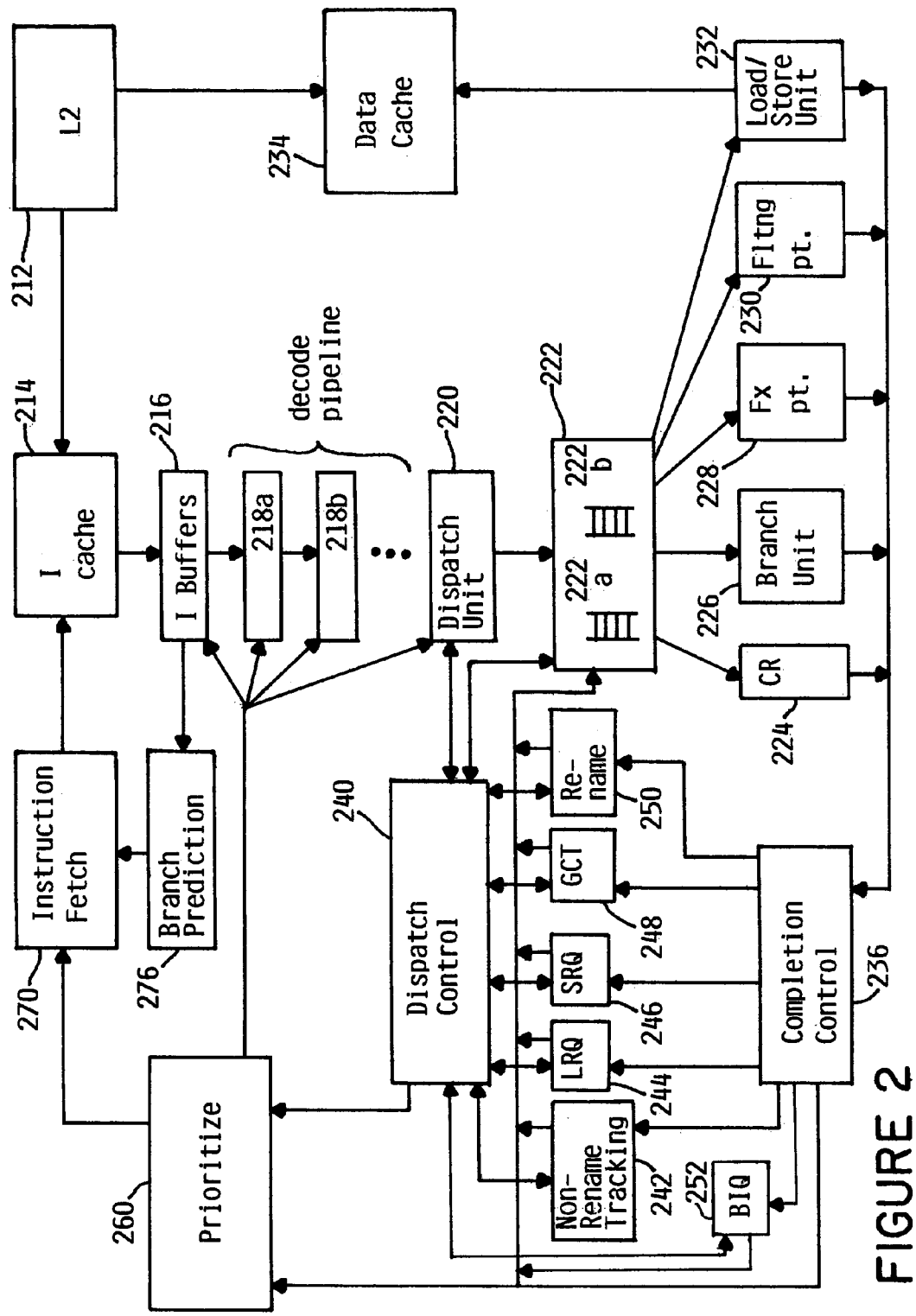
FIG. 2 is a simplified block diagram of a computer processing unit having various pipelines, registers, and execution units that can take advantage of the shared resource queue feature of the invention.

Shown in FIG. 2 is a multithreaded computer processor architecture 210 in accordance with a preferred implementation of the invention. Illustrated is an out-of-order pipelined processor such as that disclosed in System and Method for Dispatching Groups of Instructions, U.S. Ser. No. 09/108,160 filed 30 Jun. 1998; System and Method for Permitting Out-of-Order Execution of Load Instructions, U.S. Ser. No. 09/213,323 filed 16 Dec. 1998; System and Method for Permitting Out-of-Order Execution of Load and Store Instructions, U.S. Ser. No. 09/213,331 filed 16 Dec. 1998; Method and System for Restoring a Processor State Within a Data Processing System in which Instructions are Tracked in Groups, U.S. Ser. No. 09/332,413 filed 14 Jul. 1999; System and Method for Managing the Execution of Instruction Groups Having Multiple Executable Instructions, U.S. Ser. No. 09/434,095 filed 05 Nov. 1999; Selective Flush of Shared and Other Pipelined Stages in a Multithreaded Processor, U.S. Ser. No. 09/564,930 filed 04 May 2000; and Method for Implementing a Variable-Partitioned Queue for Simultaneous Multithreaded Processors, U.S. Ser. No. 09,645,081 filed 24 Aug. 2000, all these patent applications being commonly owned by the assignee herein and which are hereby incorporated by reference in their entireties.

The processor as disclosed in the above incorporated applications may be modified as described below to enable simultaneous out-of-order hardware multithreading operations. Multithreading operations in the context of the invention means hardware multithreading in which sequences of instructions, i.e., threads, execute independently from other threads, and in which hardware architected registers, execution units, and pipelined processors maintain the state of one or more independently executing sets of instructions, called threads, in the processor core hardware. With simultaneous multithreading, two or more threads are simultaneously active in the processor's pipeline. Thus, the processors' pipeline(s) are able to perform useful work on different threads when a processor pipeline stall condition is detected for one thread. Furthermore, while one embodiment of the invention will be described in the context of dual multithreading operations in which only two threads are in the processor's pipeline, registers, and queues at any one time, the principles and context of the shared queue of the invention pertain to having more than two threads in different stages of the processor's pipeline and the architected registers and queues. One of skill in the art will appreciate, moreover, that multithreaded pipelined processor architectures not having out-of-order execution or the particular sets of registers and queues as described in the incorporated patent applications can also take advantage of the shared queue feature of the present invention.

The block diagram of a multithreaded pipeline processor of FIG. 2 is greatly simplified; many connections and control lines between the various elements have been omitted for purposes of facilitating understanding of the shared queues in accordance with principles of the invention. Referring now to FIG. 2 and the instruction cache 214 at the top center of the figure, instructions for the threads in the pipeline are fetched into the instruction cache 214 from a L2 cache or main memory 212. While the L2 cache and main memory 212 have been simplified as a single unit, in reality they are separated from each by a system bus and there may be intermediate caches between the L2 cache and main memory and/or between the L2 cache and the instruction cache 214. The number of cache levels is not important because the utility of the present invention is not limited to the details of a particular memory arrangement. Address tracking and control to the instruction cache 214 is provided by the instruction fetch address register 270 having at least one address, possibly more, per thread. From the instruction cache 214, the instructions are forwarded to the instruction buffers 216 in which evaluation of branch condition may occur in conjunction with the branch prediction logic 276. In a preferred embodiment of the instruction buffers 216, instructions of each thread are distinguishable from instructions of other threads.

The decode unit 218 may require multiple cycles to complete its function and accordingly, may have multiple pipelines 218*a*, 218*b*, etc. Preferably each stage 218*a* and stage 218*b* has distinct threads. In the decode unit 218, complex instructions may be simplified or represented in a different form for easier processing by subsequent processor pipeline stages. Other events that may occur in the decode unit 218 include the reshuffling or expansion of bits in instruction fields, extraction of information from various fields for, e.g., branch prediction or creating groups of instructions. Some instructions, such as load multiple or store multiple instructions, are very complex and are processed by breaking the instruction into a series of simpler operations or instructions, called microcode, during decode.

From the decode unit 218, instructions are forwarded to the dispatch unit 220. The dispatch unit 220 may receive control signals from the dispatch control 240 in accordance with the referenced applications. At the dispatch unit 220 of the processor pipeline, all resources, queues, and renamed pools are checked to determine if they are available for the instructions within the dispatch unit 220. Different instructions have different requirements and all of those requirements must be met before the instruction is dispatched beyond the dispatch unit 220. The dispatch control 240 and the dispatch unit 220 controls the dispatch of microcoded or other complex instructions that have been decoded into a multitude of simpler instructions, as described above. The processor pipeline, in one embodiment, typically will not dispatch in the middle of a microcoded instruction group; the first instruction of the microcode must be dispatched successfully and the subsequent instructions are dispatched in order. A multithread embodiment of the invention may presume that during any given processor clock cycle an instruction from only one thread is dispatched from the dispatch unit 220 to the issue queues 222.

From the dispatch unit 220, instructions enter the issue queues 222. There may be multiple issue queues 222*a* and 222*b* and more than one thread may be present in each issue queue 222*a*, 222*b* in accordance with an embodiment of the shared queues as described herein, or there may be one issue queue per thread depending upon choice of architecture. The issue queues 222 may receive control signals from the completion control logic 236, from the dispatch control 240, and from a combination of various queues which may include, but which are not limited to, a non-renamed register tracking mechanism 242, a load reorder queue (LRQ) 244, a store reorder queue (SRQ) 246, a global completion table (GCT) 248, and a rename pools 250. The LRQ 244, the SRQ 246, and/or the GCT 248 may be split between threads, may be shared amongst the threads in accordance with an embodiment of the shared queue as described herein; or separate queues may exist for each thread as will be discussed in the context of separate or shared resources below. For tracking purposes, instructions may be tracked singly or in groups in the GCT 248 to maintain the order of instructions. The LRQ 244 and the SRQ 246 may maintain the order of the load and store instructions, respectively, as well as maintaining addresses for the program order. The non-renamed register tracking mechanism 242 may track instructions in such registers as special purpose registers, etc. The instructions are dispatched on yet another machine cycle to the designated execution unit which may be one or more condition register units 224, branch units 226, fixed point units 228, floating point units 230, or load/store units 232 which load and store data from and to the data cache 234.

The successful completion of execution of an instruction or, on the other hand, mispredicted branches or notification of errors which may have occurred in the execution units are forwarded to the completion control logic 236, which may generate and transmit a refetch signal to any of a plurality of queues, the non-renamed register tracking mechanism 242, the LRQ 244, the SRQ 246, the GCT 248, or the renamed pools 250. Alternatively, recovery and/or flush techniques may occur in response to the output of the completion control logic 236.

As discussed, though, separate data structures and queues are not as efficient as a structure shared amongst the threads because either the structure is fixed or changes so slowly to be unable to accommodate dynamic and responsive processing. Thus, the preferred embodiment of the invention further contemplates that the data structures and registers be architected as shared resources. Shared resources are those processor registers and queues which can be shared by either thread either separately or at the same time. In some circumstances, the non-renamed tracking register 242, the LRQ 244, the SRQ 246, the GCT 248, the register renamed pools 250, the issue queues 222, the branch information queue (BIQ) 252 may be shared amongst threads. Alternatively, some resources may be shared while others may be private, e.g., the GCT 248 may be shared while the LRQ 244 and the SRQ 246 may be private depending upon the particular architecture. The use of shared resources for the various queues yields performance benefits without increasing the chip area over the shared queue case.

Figure 3:
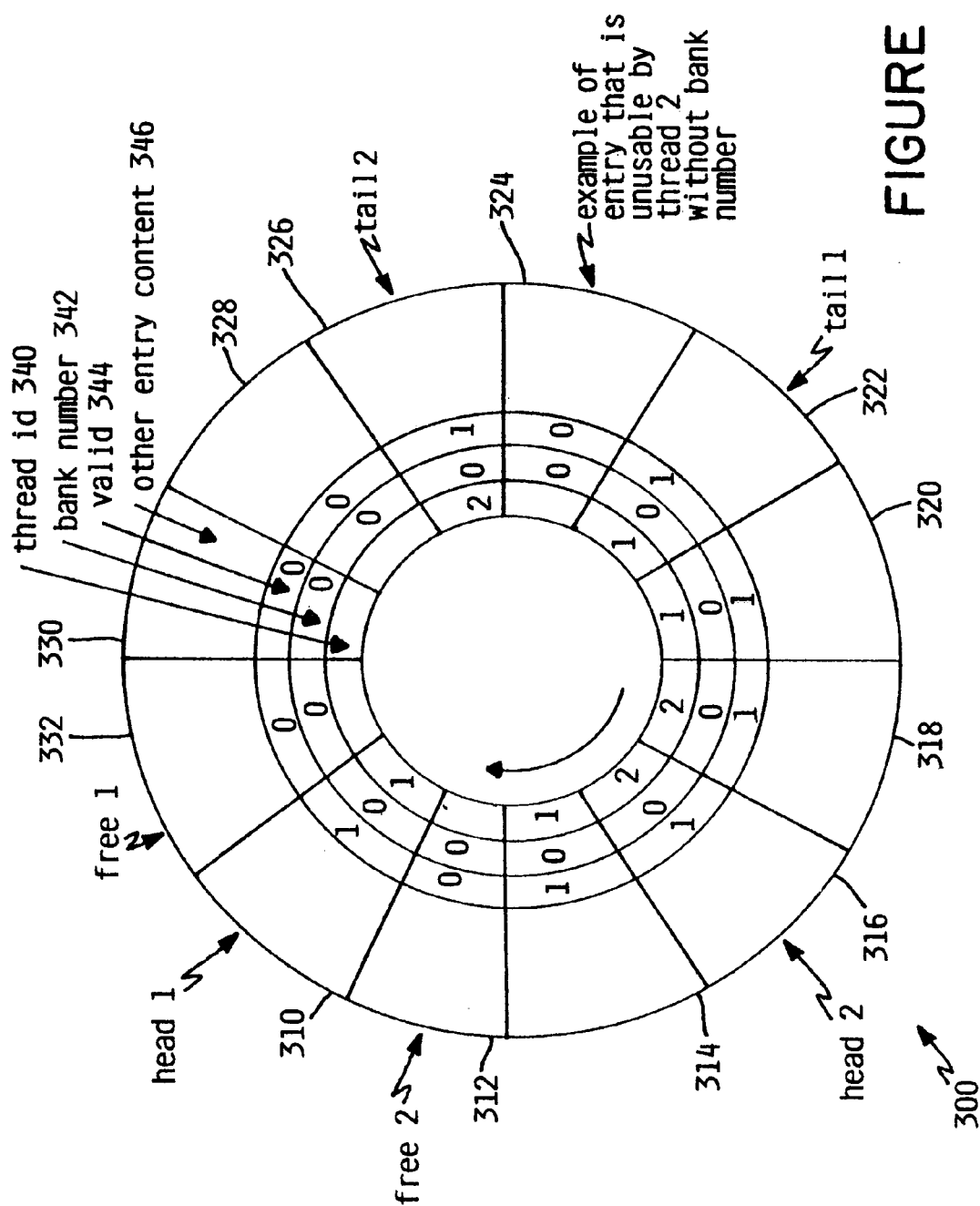
FIG. 3 is a block diagram of a queue in a multithreaded processor in accordance with an embodiment of the invention shared by two threads.

FIG. 3 is a diagram of a shared queue 300 in accordance with an embodiment of the invention. This queue 300 may be any of the queues which are shared by the multiple threads, such as a BIQ 252 and other queues shown in FIG. 2, e.g., the LRQ 244, the SRQ 246, and the GCT 248. The shared queue 300 has a number of entries 310–332. Each entry has a number of fields, 340–346; field 340 identifies the thread; field 342 holds a bank number which represents how many times a head pointer has passed a tail pointer for a particular thread, as will be explained; valid/invalid field 344 indicates if the entry contains valid data; and content-specific field 346 may hold other content specffic to the queue, thread, or entry. For instance, if the queue 300 is used as a GCT, then the content 346 might be, e.g., pointers to the architected and physical registers used by the instructions, the type of instruction, what execution unit would be used, bits indicating when each instruction is a group is complete, etc. When the shared queue is a LRQ or an SRQ, the queue might contain the virtual addresses of the load/store memory location and/or a pointed to the group in the GCT. The queue 300 of FIG. 3 is illustrated with two independent threads of execution within the pipeline but the concepts apply equally to multiple independent threads greater than two.

The queue elements or entries 310–332 are organized into a first-in first-out (FIFO) queue 300. There is a head pointer and a tail pointer for each thread. The head and tail pointers of one thread are independent from those of another thread. An entry can be occupied by only one thread at a particular time. To improve queue allocation time, each thread also has a free pointer which points to the next entry that the thread could use for allocation. Referring specifically to FIG. 3, the first thread has a head pointer in entry 310 thus representing the newest entry for that thread. The thread identification field 340 of entry 310 indicates that this entry is associated with thread 1; the bank field indicates that the field is associated with bank 0 indicating that the tail pointer has not passed the head pointer for this thread; and the valid field 344 indicates the entry is valid. Other entries associated with thread 1 are entries 314, 320 and the tail pointer 322. The next free entry available for thread 1 is entry 332. Similarly, for thread 2, the head pointer is in entry 316, the tail pointer is in entry 326, and its free pointer is in entry 312.

Figure 4:
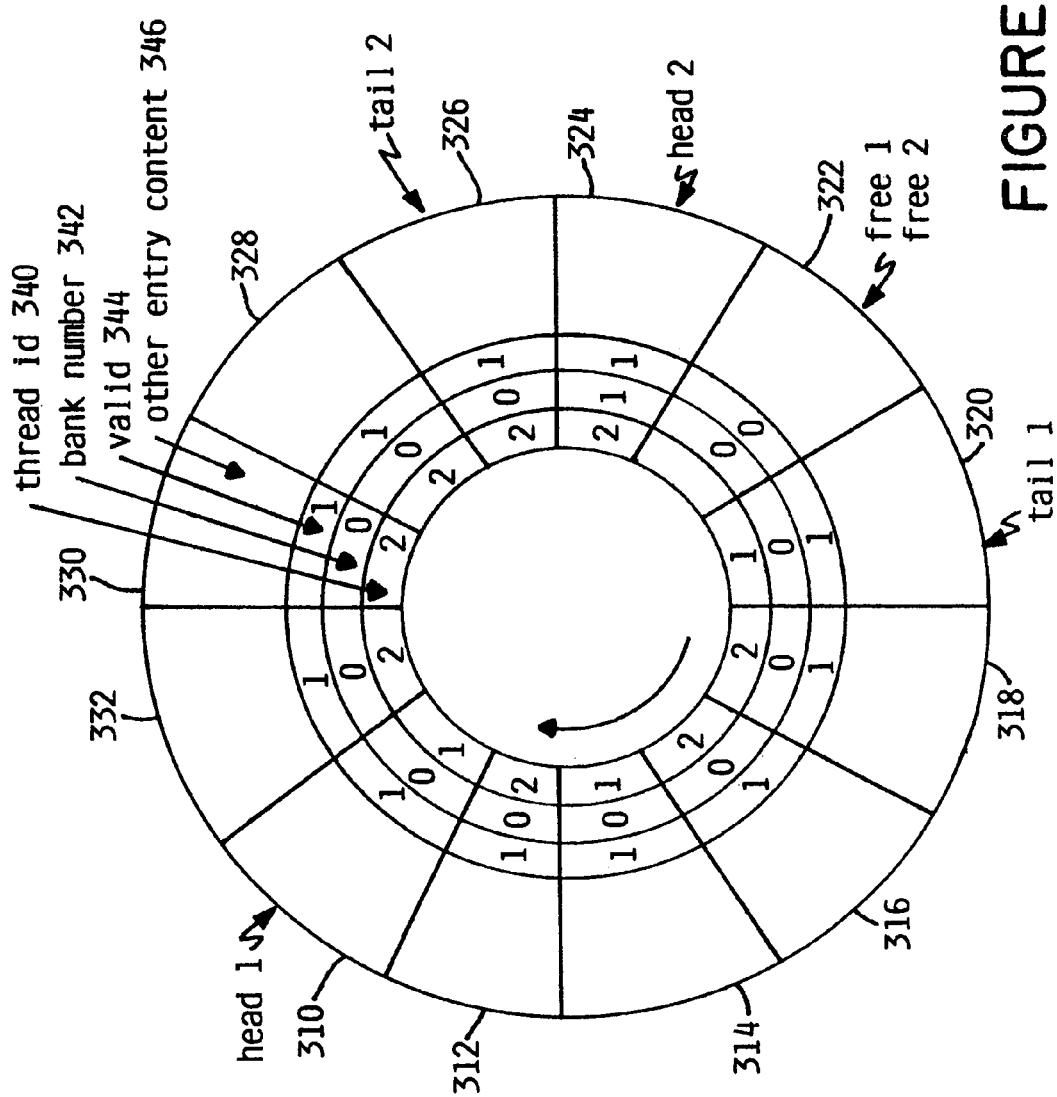
FIG. 4 is a block diagram of a queue in a multithreaded processor in accordance with another embodiment of the invention in which all entries of the queue are used by resources belonging to two threads.

In a typical queue the valid entries for one thread are located between the head and tail pointers for that thread when viewed as a circular queue. There are entries between the head and tail pointers of a particular thread but that are outside the range of another thread's head and tail pointer and hence unusable by the other thread. There may be many unusable entries if there are multiple threads. In a preferred embodiment of the invention, as shown in FIG. 4, the previously unusable free entries are made accessible by allowing a thread to have its head pointer pass (wrap around) its tail pointer. A multibit "bank" number tracks the number of times the head pointer has passed the tail pointer of the same thread. To fully utilize all entries with many threads may require allowing one thread's head pointer to wrap around its tail pointer multiple times. In an out-of-order processor, the program order of instructions is maintained by comparing bank number and the position in the queue. Thus, as the head pointer passes the tail pointer, the bank number is incremented up to a maximum number determined by the number of bits used to represent the bank number.

In order to best understand and take advantage of this wrap-around features, it is useful to establish some basic premises: the tail pointer indicates the oldest entry. As the tail pointer advances, entries are deallocated, i.e., made invalid. The head pointer indicates the newest entry; as the head advances, entries are allocated, i.e., made valid. The free pointer points to the next entry to be allocated, i.e., the next entry for the head. If there is no entry that can be allocated, the free pointer is the same as the head pointer. As the head and tail pointers move in reaction to allocation and deallocation of entries, the head pointer can pass the tail pointer and the tail pointer can pass the head pointer, in either direction, thus preventing unusable entries in the queue.

FIG. 4 is a diagram of the same queue 300 in which entry 322 has been deallocated by thread 1. The tail pointer for thread 1 is now pointing to entry 320. Entries 312, 332, 334, 328 and 324 have been allocated to thread 2. The head pointer of thread 2 in entry 324 has passed its tail pointer in entry 326. Note that now the field for bank number 342 of the head pointer entry 324 indicates that it has passed the tail pointer once by the "1" in the field. The free pointers of both threads now are in entry 322 which could be used by either thread 1 or thread 2, but not both at the same time.

Figure 5:
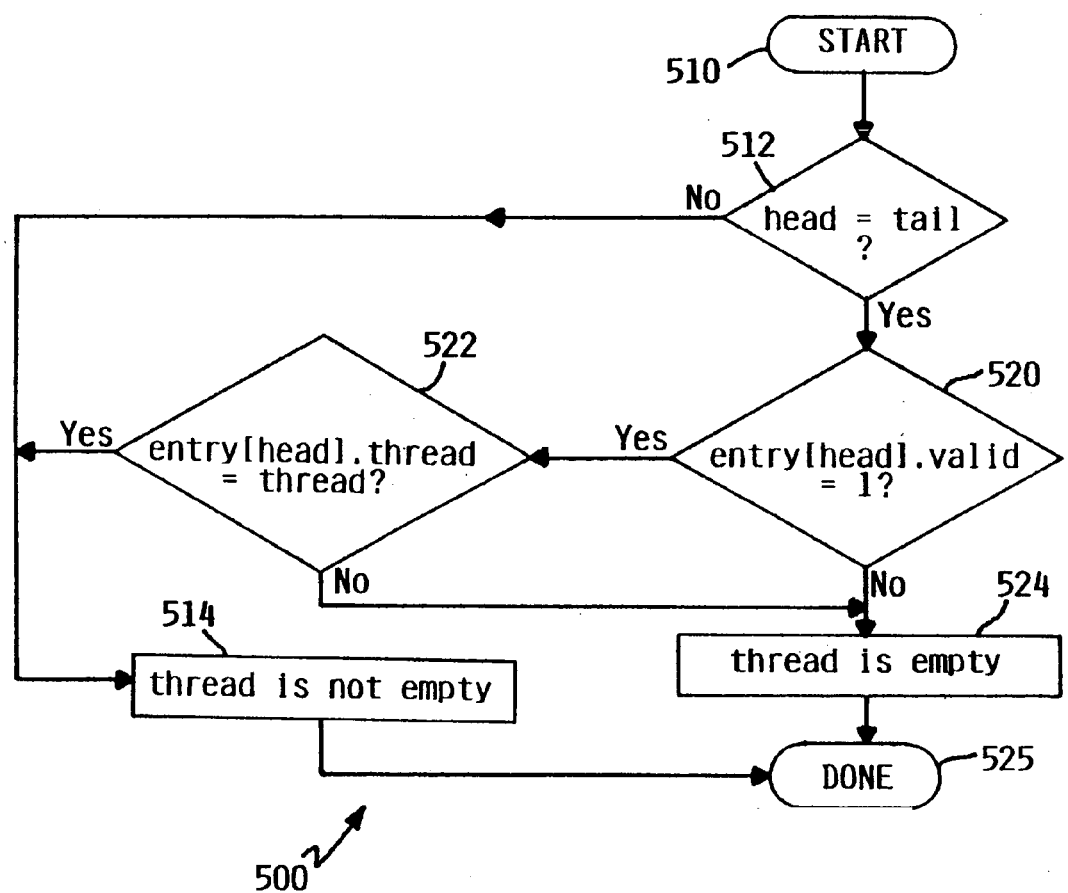
FIG. 5 is a simplified flow chart of a method by which the processor can determine if a queue has any resources pertaining to a particular thread in accordance with a feature of the invention.
Figure 6:
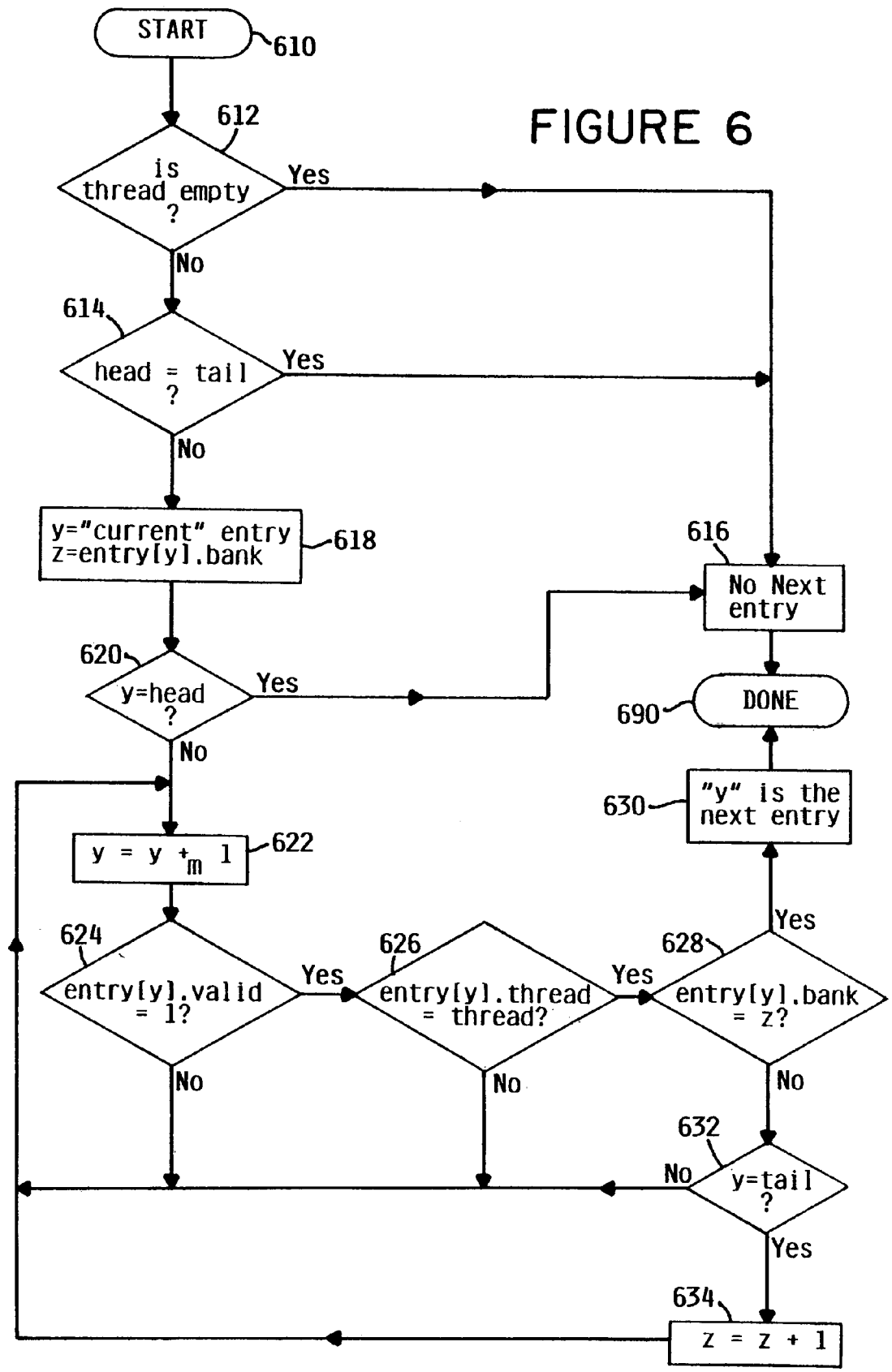
FIG. 6 is a simplified flow chart of a method of how to find a next entry in the shared resource pertaining to a particular thread in accordance with a feature of the invention.
Figure 7:
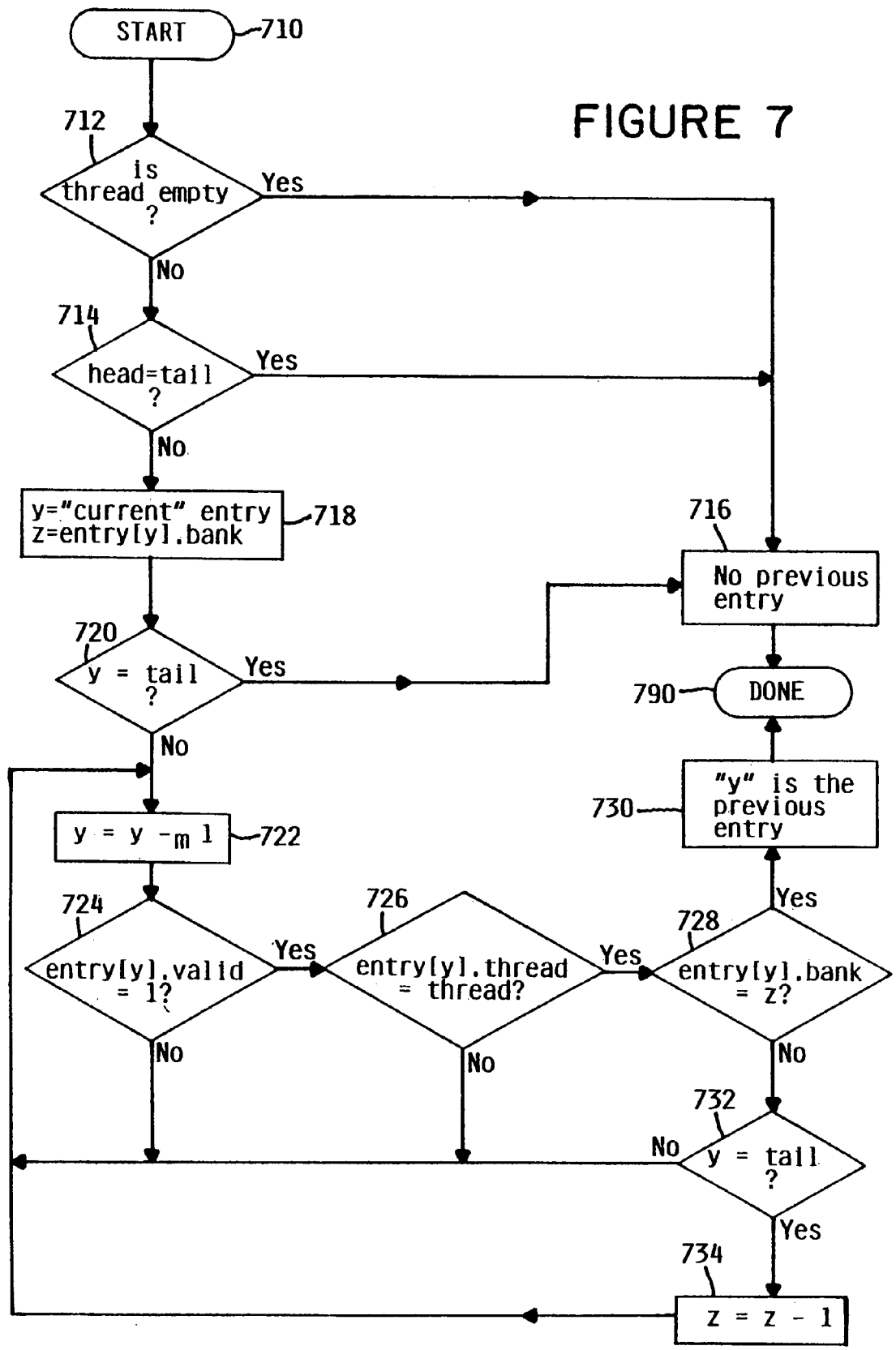
FIG. 7 is a simplified flow chart of method that locates a previous entry in the shared resource pertaining to a particular thread in accordance with a feature of the invention.

FIG. 5 is a simplified flow chart of how the method of invention determines that a queue has or does not have any entries in the queue 300 pertaining to a particular thread. This process as well as the processes described in FIGS. 6 and 7 are performed routinely throughout the allocation, deallocation, and flushing of entries in the queue, as described later. This and the other processes subsequently described herein involve looping which checks every entry in the queue although some of the processes can exit before checking every entry, as will be indicated individually. While the processes are described sequentially, it is important to understand that all the queue entries are preferably checked in parallel in the hardware implementation.

Recall that the process in FIG. 5 determines if a queue has an entry for a particular thread. In FIG. 5, the process starts and inquires at step 512 if the head pointer is at the same entry as the tail pointer. If the head pointer is at a different entry than the tail pointer then there are entries in the queue pertaining to the thread, or as expressed in the flow chart, the thread is not empty, as in step 514 and the process is complete as in step 525. If, however, the head pointer is at the same entry as the tail pointer, as in the inquiry at step 512, then the various fields of that entry are interrogated. The first field interrogated in step 520 may be whether the entry having the head pointer is a valid entry. If the entry is not valid, then the queue has no entries for that particular thread, as in step 524 and the process completes as in step 525. If, however, the entry is valid, then in step 522, the thread identification field is checked to determine if the entry is associated with the particular thread. If the entry pertains to another thread, then the queue is empty as in step 524 for that particular thread. Of course, if the valid entry corresponds to the same thread number as the thread under consideration, then the queue is not empty and the process moves onto other processes as described herein.

FIG. 6 describes a process used in accordance with an embodiment of the invention to find the next entry in the queue starting from a given entry, called the "current" entry pertaining to a particular thread. At step 610, the process starts and determines in step 612 if the queue has any entries belonging to the particular thread in question. If the queue has entries of a certain thread, then in step 614, the process checks if the head pointer and the tail pointer of that thread are in the same entry. If so, then there is only one entry of that thread in the queue and there is no next entry as in step 616. If the head and tail are not in the same entry, then in step 618, the remainder of the process starts from the current entry and the index of the current entry is saved as "y". The field for the bank number is set to a bank number of that current entry and saved to "z". The process continues to step 620 which determines if the current entry contains the head pointer. If the current entry does contain the head pointer pertaining to a particular thread, then there are no other entries for that thread in the queue, as in step 616, and the process completes as in step 690.

If the current entry, however, is not the same as the head pointer of a particular thread, in step 620, then the adjacent entry is selected as in step 622. In the queue structure of FIGS. 3 and 4, the adjacent entry is the next entry except that if the entry is at the bottom of the queue, then the next entry at the top is checked. The nomenclature "+m" is used to indicate this behavior. In step 624, the entry is checked to see if it is a valid entry. Then, as in step 626, the thread identification field is interrogated to determine if the thread matches the particular thread seeking its next entry, and then in step 628 the bank field is interrogated to determine if it has the same bank number as the original entry. If the response to these inquiries is yes, then in step 630, the next entry has been found and the process of finding the next entry is complete. If the bank number "z" is not the same as the current entry, then in step 632, the process checks to see if the entry pointer is the same as the tail pointer and if so, then the bank counter is increased by one in step 634 to indicate that the current entry is passing the tail pointer. In any event, if the entry is not valid (step 624) and/or the entry does not pertain to the current thread (step 626) and/or the bank number is not the same as the banks of the current entry (step 628) and the entry is not the tail pointer (step 632), then the process advances to the adjacent entry in step 622 and the process repeats. Thus, the next entry for a particular thread in a queue having interspersed entries amongst the various threads is determined if the entry is valid (step 624), if the thread field corresponds to the particular thread (step 626), and if the bank number is the same bank as that determined in step 628 or if the next higher bank number if the process passes the tail pointer (step 632).

FIG. 7 is a simplified flow chart to find the previous entry in a queue pertaining to a particular thread starting from a given entry called the "current" entry. If a particular thread has entries in the queue as in step 712, then the inquiry focuses on whether the head pointer and the tail pointer are in the same entry of the queue, as in step 714. If the head and tail pointer of a particular thread are not in the same entry, then in step 718, the index of the current entry is saved as "y" and the bank number of the current entry is saves to "z". The process ascertains whether the entry contains a tail pointer as in step 720, and if so, then there are no previous entries for a particular thread as in step 716 and process completes in step 790.

If, however, the current entry is not the same as the tail pointer, then in step 722 the adjacent entry in an opposing direction to that used in FIG. 6 selected as the current entry, i.e., in the queue structure of FIGS. 3 and 4, the adjacent entry is the previous entry except that if the entry is at the top of the queue, the previous entry at the bottom is checked. That entry is evaluated to determine if the entry is valid (step 724), if the entry pertains to the particular thread (step 726), and if the entry has the same bank number as the current entry (step 728). If the answer to these three inquiries is affirmative, then the previous entry pertaining to that particular thread has been found, as in step 730. If, however, the entry is either not valid (step 724), or the entry does not pertain to the particular thread (step 726), then in step 722, the previous entry is selected as the current entry for evaluation. If the entry is valid (step 724), and if the entry pertains to the particular thread (step 726), but the bank number is incorrect (step 728), then the process determines if the entry contains a tail pointer, as in step 732. If so, then the process decrements the bank number, as in step 734 and the process cycles to step 722 to check the next previous entry as the current entry.

Figure 8:
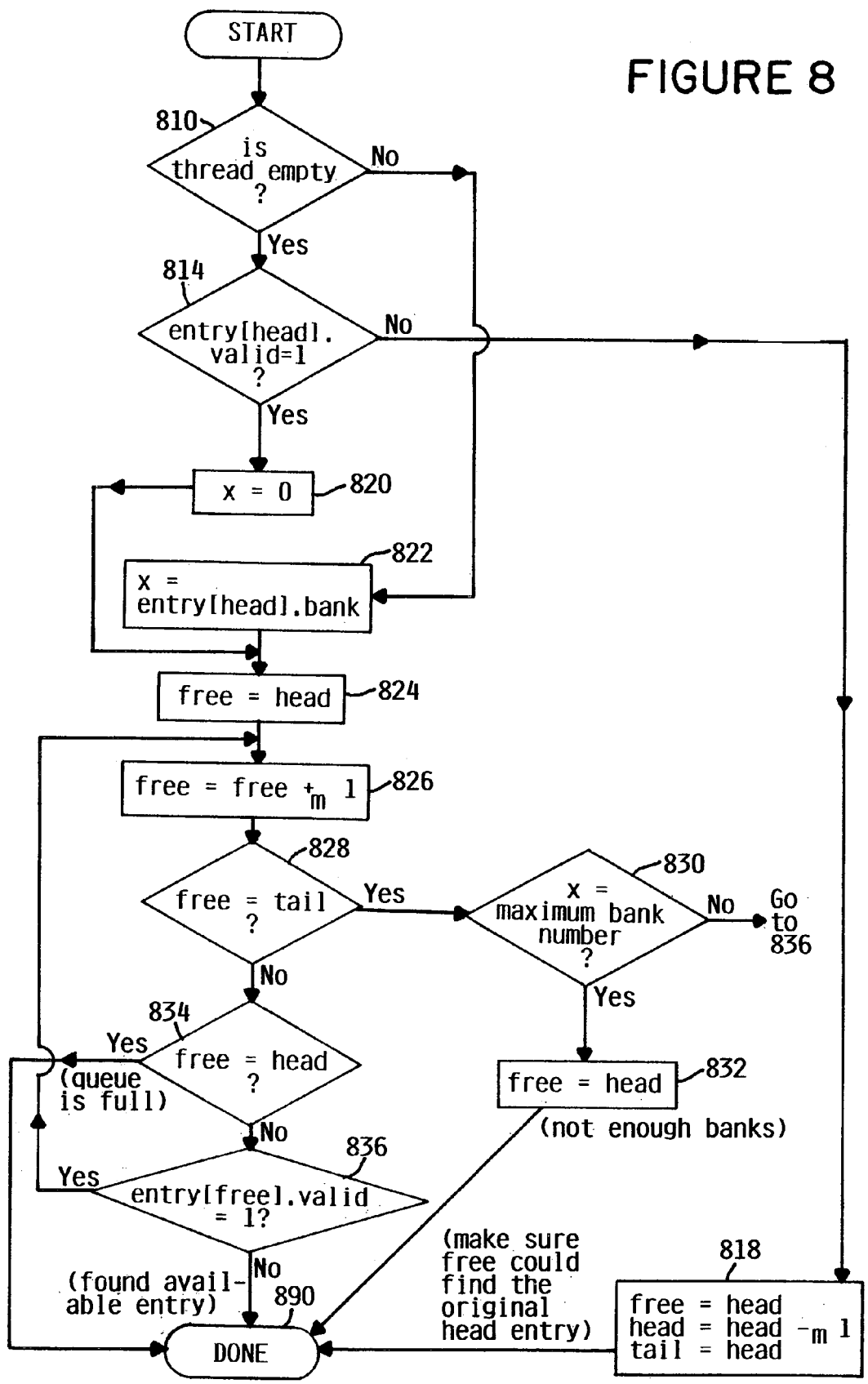
FIG. 8 is a simplified flow chart of a method to locate a free entry in the shared resource for a particular thread in accordance with a feature of the invention.

FIG. 8 is a simplified flow chart of how to locate a free entry in the queue for a particular thread. Recall that a free pointer refers to the next available entry in a queue for a particular thread. A brief overview of the process is that the free pointer is first moved to the next invalid entry starting from the current entry having the head pointer. If there are no more invalid entries, the free pointer is left in the same entry as the head pointer. If the bank number of the entry having the head pointer is the maximum bank number value, and if the free pointer would pass the entry having the tail pointer, the free pointer is left the same as the head pointer because this would require an impossibly large bank number. The value of the free pointer is re-evaluated every cycle or at least each cycle in which an entry is allocated or deallocated.

Starting at step 810 of FIG. 8, if the queue is not empty with respect to a particular thread, the process shifts to step 822. If the queue is empty of a particular thread, as in step 810, and the current entry is a valid entry with a head pointer, as in step 814, the process jumps to step 820. If, however, the entry is not valid (step 814), the process sets the free pointer to be the same as the head pointer and then moves the head pointer to the adjacent entry and also sets the tail pointer to that entry in step 818. The process completes in step 890.

Starting at step 820, the counter "x" for the entry is set to zero and a free pointer is set as the head pointer, in step 824. On the other hand, if at step 810, the queue already contains entries pertaining to the thread under consideration, then in step 822, the counter "x" is set to the bank number of the entry at the head and again, the free pointer in that entry having the head pointer for the thread is set, as in step 824. In step 826 the process advances the free pointer to the adjacent entry and establishes whether that entry is the tail pointer, as in step 828. If so, at step 830, the process checks if the head entry is at the maximum bank number. If so, then the free pointer is set to be a head pointer in step 832 and the queue does not have enough banks for the particular thread under consideration.

If, in step 828, the entry at the free pointer is not at the tail pointer then it proceeds to check if the entry is the head pointer in step 834. If so, then the queue is full and process is completed as in step 890. If the entry at the free pointer is not at the head pointer, then, in step 836, the entry is checked to see if the entry at the free pointer is valid. If so, that entry is already occupied. If the entry having the free pointer is not valid, it means that the entry is available for the thread under consideration and the process completes in step 890. If the entry is valid, the free pointer moves to the adjacent entry at step 826.

Figure 9:
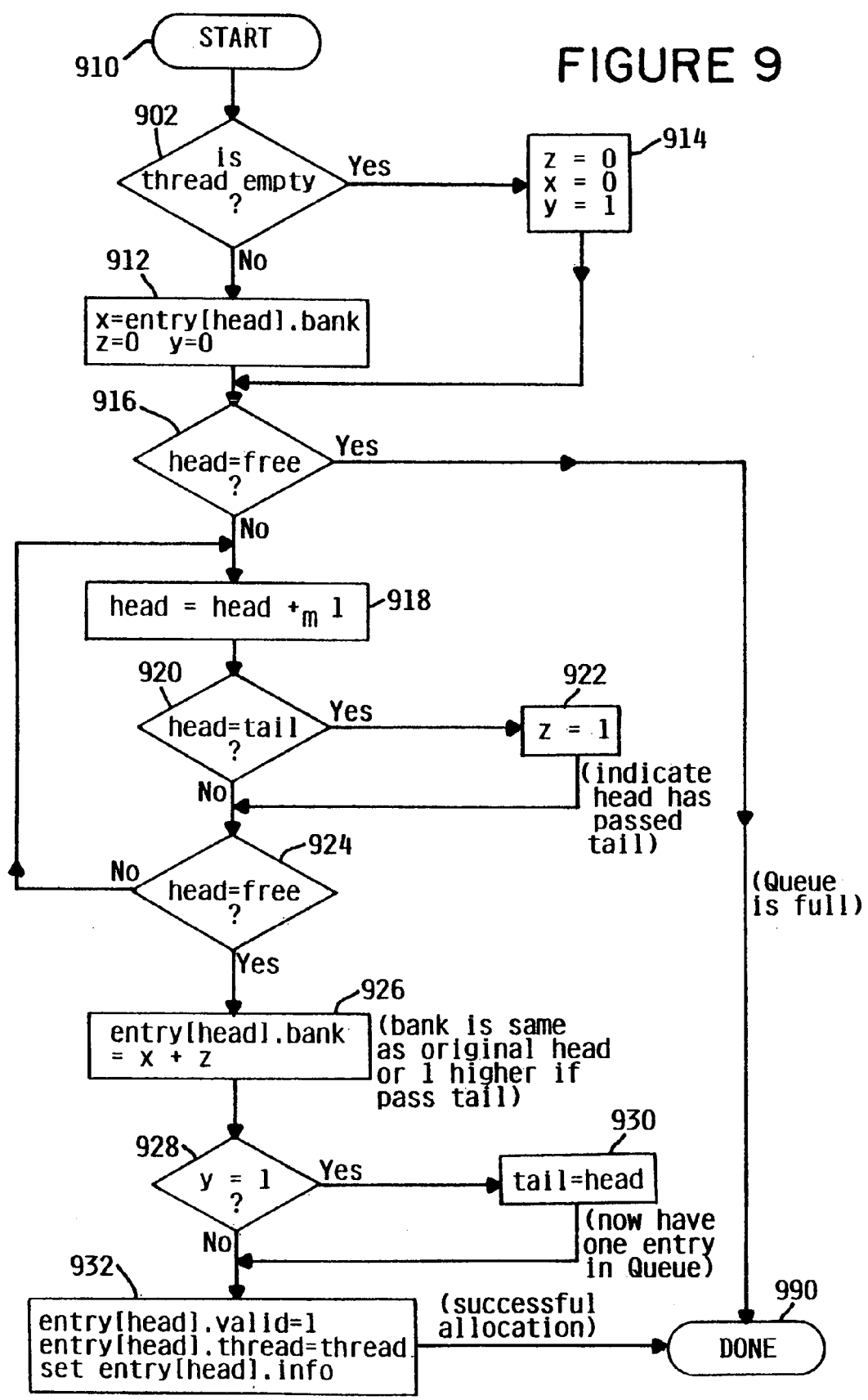
FIG. 9 is a simplified flow chart of a method to allocate an entry in a shared resource to a particular thread in accordance with a feature of the invention.

FIG. 9 is a flow chart of allocating entries in a shared resource queue in accordance with an embodiment of the invention. An overview of the process of allocating an entry checks if the entry at the head pointer is also at the free pointer. If not, the head pointer advances to the entry having the free pointer so than an entry can be allocated. If the head pointer passes the tail pointer in this process, the bank number of the new head is made one larger than the bank number of the old head pointer. The entry is marked valid and the thread number is set to this thread. The free pointer then attempts to advance.

In more detail now, the process begins at step 910 and inquires if the queue contains any entries pertaining to the thread under consideration (step 902). If so, in step 912 the counters "y" and "z" are set to "0", and the counter "x" is set to bank of the head pointer. If there are no preexisting entries in the queue as determined in step 902, then in step 914, the queue is initialized for that thread by setting the counters "x" and "z" to "0", and counter "y" to "1". In any event, the process inquires at step 916 if the head pointer and the free pointer for a particular thread are at the same entry. If so, this indicates that the queue is full and the process terminates to step 990. If, however, the queue is not full, then at step 918, the process advances the head pointer to the adjacent entry and asks if that entry is also the tail pointer as in step 920. If so, then in step 922, it means that the head pointer has passed the tail pointer and so in step 922, the counter "z" is set to one and proceeds to step 924. If the head pointer is not the same as the tail pointer (step 920), the process inquires at step 924 if the entry is at the free pointer. If not, then the process loops back to step 918 to move the head pointer to the adjacent entry. If, however, the entry is at the free pointer in step 924, then in step 926 the process sets the bank of the new entry to either the bank of the original head entry or one higher if the tail pointer was passed.

In step 928, the process queries the value of "y" to see if the queue was originally empty at start. If so, the tail pointer is set to the head pointer indicating that the queue has only one entry pertaining to a particular thread as in step 930. Now the new entry is initialized and the entry is set to contain valid information, pertain to the particular thread, and store the information in the entry for successful allocation, as in step 932. The process then terminates at step 990.

FIG. 10 takes the user through the steps to deallocate an entry in a queue according to features of the invention. Briefly, to deallocate an entry, the entry having the tail pointer is made invalid. The tail then advances to the next entry in the same thread with the same bank value, which will be zero. Any entries for this thread with a higher bank number are skipped over by the tail pointer but the bank values of these skipped-over entries are decremented.

At step 1010, the process begins and the entry at the tail pointer is made invalid in step 1012. The process then inquires if the entry having the tail pointer also contains the head pointer in step 1014. If so, it means that there was only one entry in the queue pertaining to the thread under consideration and the process completes in step 1090 because all the entries have been deallocated by marking the valid field to zero. If, however, there are more entries pertaining to the particular thread, then in step 1016, the entry counter "y" is set to hold the tail pointer. The process then finds the next entry from that tail pointer pertaining to that thread, as in FIG. 6, it sets that entry to contain the tail pointer as in step 1018. In step 1020, the process moves to the adjacent entry and in step 1022, the process checks to see if the entry is at the tail pointer. If so, then all entries between the old tail and the new tail are checked and the process terminates in step 1090. If however, the entry is at the tail pointer, then in steps 1024 and 1026 the process checks if the entry contains valid information and if the entry pertains to the particular thread. If the answer is no to either or both of the questions the process loops to find the adjacent entry at step 1020 pertaining to that thread to be deallocated. If, however, the entry contains valid information (step 1024), and pertains to the thread under consideration (step 1026), then the bank field for that entry is decremented because the tail has moved past the entry. This process moves to the adjacent entry in step 1020. Thus, only those entries for a particular thread have their bank number decremented.

Figure 11A:
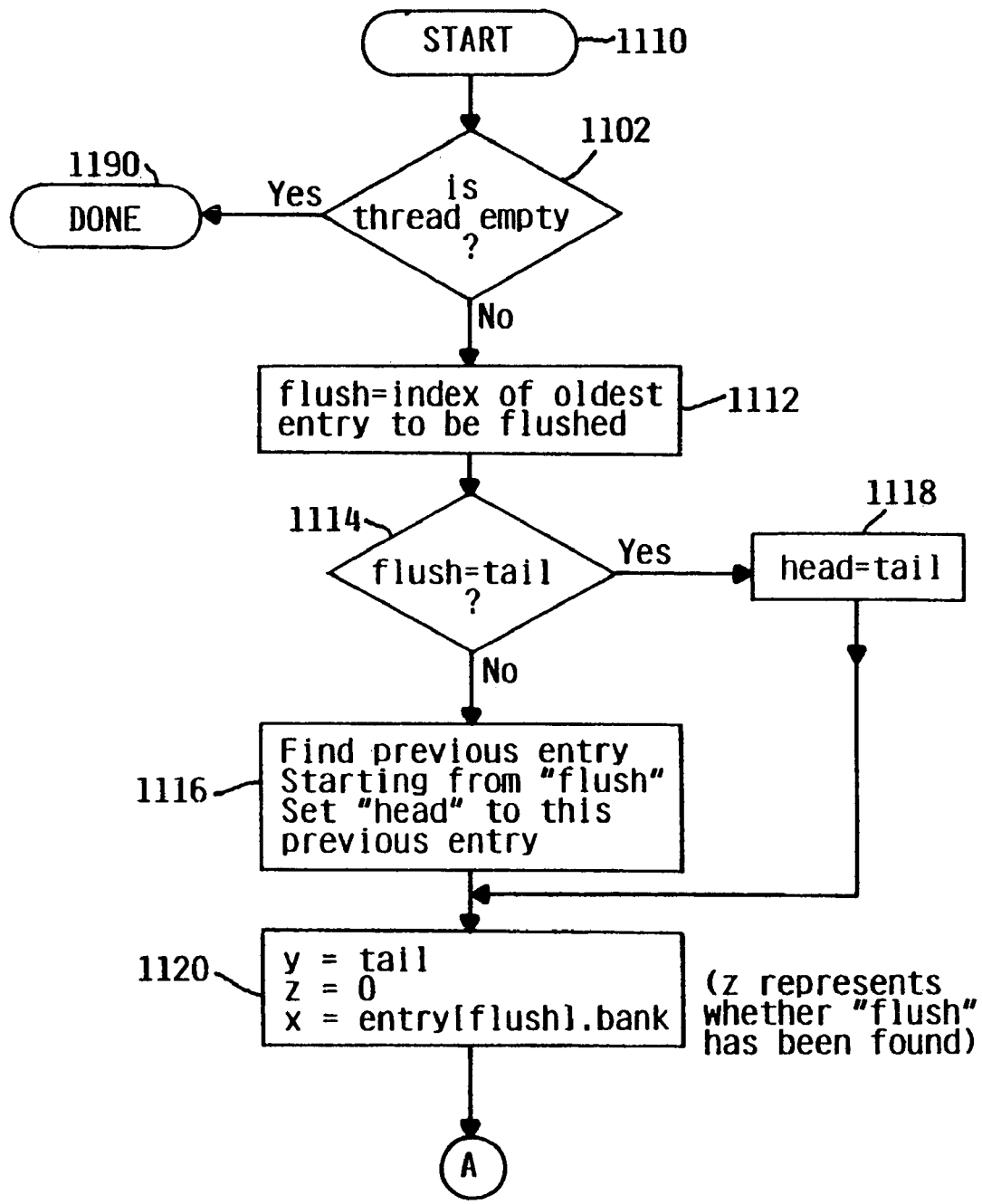
FIG. 11 is a simplified flow chart of a method to flush the resources pertaining to a particular thread in a shared resource queue in accordance with a feature of the invention.
Figure 11B:
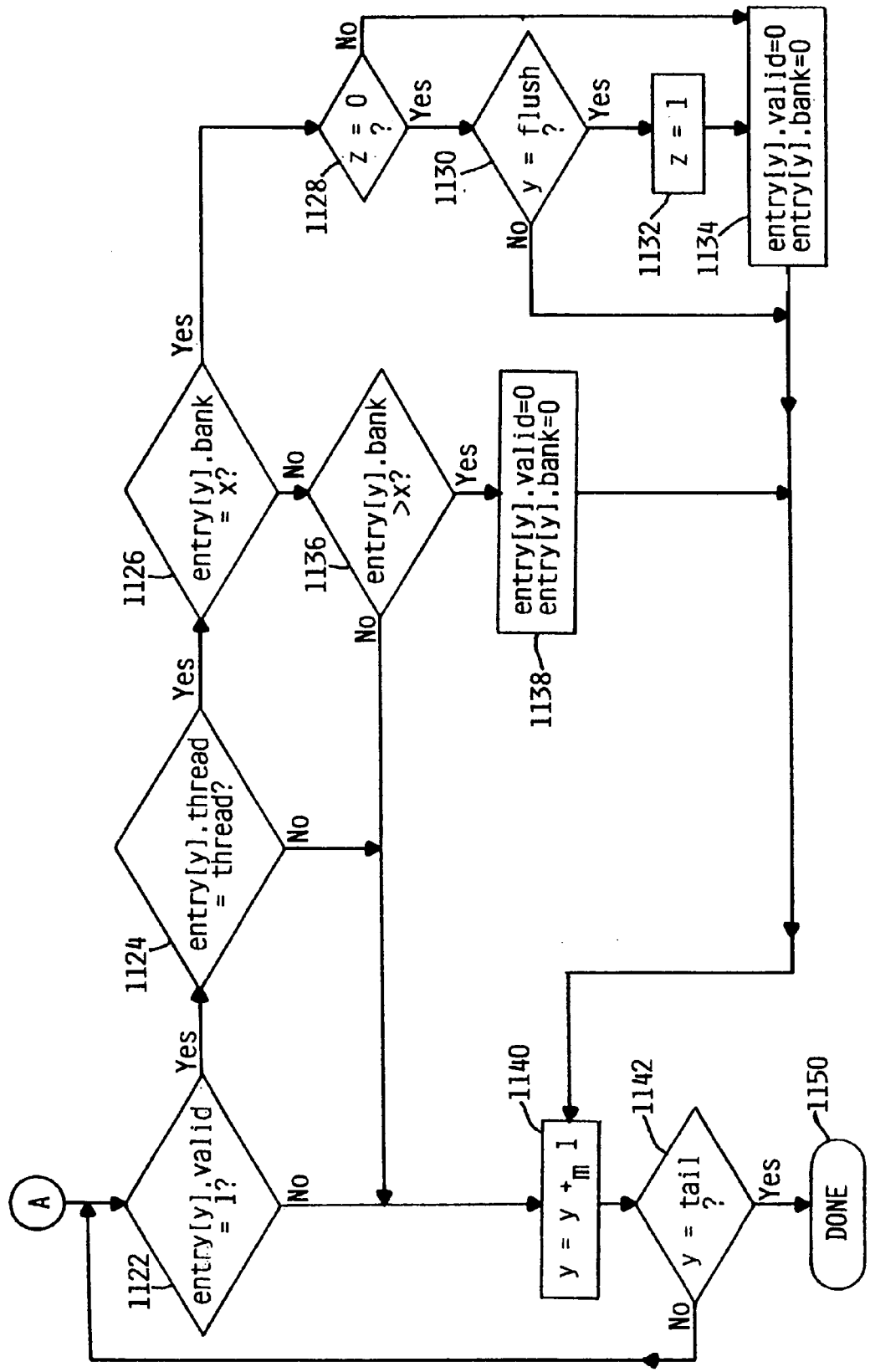

FIGS. 11*a* and 11*b* state how to flush a queue for a particular thread which may occur, for instance, because a branch mispredict or other problem requires the entries to be removed and later either refetched or a different set of instructions are fetched. A flush invalidates all logically contiguous entries starting at the head pointer and going to the flush point by marking the entries as invalid. The process specifies the index of the flush point which is the oldest entry to be flushed and the head pointer will point to the youngest entry just older than the flush point at the end of the process. If the bank number of the entry having the head pointer is the same as the bank number of the flush point, then all entries with that bank number inclusive between the two are flushed. The head pointer then moves to the entry older than the flush point. If, however, the bank numbers are different, note that the head pointer must have a larger bank number, then all entries with a bank number greater than the bank of the flush point are flushed. The head pointer logically points to the youngest entry of the same bank as the flush point. The youngest entry is determined by the relative location of the entries with respect to the entry having the tail pointer.

In step 1110, the process starts and in step 1102 determines if the queue has any entries for the particular thread. If the thread is empty for the thread, the process terminates at step 1190. If, however, the queue has entries for the thread under consideration, then at step 1112, the counter "flush" is set to the oldest entry to be flushed. In step 1114, the process determines if the flushed entry is at the tail pointer. If so, the queue for the thread will be empty, so the head pointer is set to the tail pointer. If any entries are not flushed, as determined by step 1114, then in step 1116, the process finds the previous entry as in FIG. 7 starting from the flushed entry and the head pointer points to this entry. In step 1120, the counter "y" is set to the tail and the counter "z" indicates when the "flush" entry is found and "x" is set to the bank of the flush entry.

In FIG. 11b, at steps 1122, 1124, and 1126, the various fields of the entry are interrogated and if the entry is valid (step 1122), pertains to the thread under consideration (step 1124) and has the same bank counter as the bank that is being flushed (step 1126), and if the counter "z" is not zero (step 1128), then the entry is invalidated and the bank number is set to zero in step 1134. If the entry is invalid (step 1122) and/or the entry does not pertain the thread under consideration (step 1124), then the process moves to the adjacent entry in step 1140. Then the process inquires if that entry is the tail pointer in step 1142 and if so, the process completes at step 1150. If not, the process loops back to steps 1122–1126 to check the fields of the particular entry.

If, in step 1126, the bank counter is not equal to the bank that is being flushed, the process checks to see if the bank counter is greater than the bank of the entries being flushed, as in step 1136. If the bank counter is greater than the bank counter being flushed, then the entry is flushed in step 1138 by setting the entry to be invalid and the bank counter to be zero.

If, in step 1130, the entry is the same as the counter "flush" then the counter "z" is set to one to indicate that we found the flush entry in step 1132. The entry is made invalid in step 1134 and the process advances to step 1140.

Note that there are many repetitive steps throughout the figures that easily lend themselves to modular software loops or preferably, if manifested in hardware, to route the digital signals through the same logic.

Thus, while the invention has been described with respect to preferred and alternate embodiments, it is to be understood that the invention is not limited to processors which have only out-of-order processing but is particularly useful in such applications. The invention is intended to be manifested in the following claims.

What is claimed is:

1. A resource queue, comprising:
   (a) a plurality of entries, each entry having unique resources required for information processing;
   (b) the plurality of entries allocated amongst a plurality of independent simultaneously executing hardware threads such that resources of more than one thread may be within the queue; and
   (c) a portion of the plurality of entries being allocated to one thread and being capable of being interspersed among another portion of the plurality of entries allocated to another thread wherein a first entry of one thread is capable of wrapping around a last entry of the same thread to access an available entry;
   (d) a head pointer and a tail pointer for at least one thread wherein the head pointer is the first entry of the at least one thread and the tail pointer is the last entry of the at least one thread, and
   (e) one of the unique resources is a bank number to indicate how many times the head pointer has wrapped around the tail pointer in order to maintain an order of the resources for the at least one thread.

2. The resource queue of claim 1, further comprising:
   (a) at least one free pointer for the at least one thread indicating an entry in the queue available for resources of the at least one thread.

3. The queue of claim 1, wherein the information processing further comprises:
   (a) an out-of-order computer processor, and
   (b) the resource queue may further comprise a load reorder queue and/or a store reorder queue and/or a global completion table and/or a branch information queue.

4. An out-of-order multithreaded computer processor, comprising:
   (a) a load reorder queue;
   (b) a store reorder queue;
   (c) a global completion table;
   (d) a branch information queue, at least one of the queues being a resource queue comprising:
       (i) a plurality of entries, each entry having unique resources required for information processing;
       (ii) the plurality of entries allocated amongst a plurality of independent simultaneously executing hardware threads such that resources of more than one thread may be within the queue; and
       (iii) a portion of the plurality of entries being allocated to one thread and being capable of being interspersed among another portion of the plurality of entries allocated to another thread;
       (iv) a first entry of one thread being capable of wrapping around a last entry of the same thread;
       (v) a head pointer and a tail pointer for at least one thread wherein the head pointer is the first entry of the at least one thread and the tail pointer is the last entry of the at least one thread;
       (vi) a bank number to indicate how many times the head pointer has wrapped around the tail pointer in order to maintain an order of the resources for the at least one thread; and
       (vii) at least one free pointer for the at least one thread indicating an entry in the queue available for resources of the at least one thread.

5. A method of allocating a shared resource queue for simultaneous multithreaded electronic data processing, comprising:
   (a) determining if the shared resource queue is empty for a particular thread;
   (b) finding a first entry of said particular thread;
   (c) determining if the first entry and a free entry of the particular thread are the same;
   (d) if, not advancing the first entry to the free entry;
   (e) incrementing a bank number if the first entry passes a last entry of the particular thread before it finds the free entry;
   (f) allocating the next free entry by storing resources for the particular thread.

6. The method of claim 5, further comprising deallocating multithreaded resources in the shared resource queue, comprising:
   (a) locating the last entry in the shared resource queue pertaining to the particular thread;
   (b) determining if the last entry is also the first entry for the particular thread;
   (c) if not, finding the next entry pertaining to the particular thread;
   (d) determining if the bank number of the next entry is the same as the last entry and if so, deallocating the next entry by marking the resources as invalid; and
   (e) if not, then skipping over the next entry and decrementing the bank number;
   (f) finding the next previous entry pertaining to the particular thread.

7. The method of claim 5, further comprising flushing the shared resource queue, comprising the steps of:
   (a) setting a flush point indicative of an oldest entry to be deallocated pertaining to the particular thread; and
   (b) invalidating all entries between a head pointer and the flush point which have the same and greater bank number than the bank number of the flush point.

8. A shared resource mechanism in a hardware multithreaded pipeline processor, said pipeline processor simultaneously processing a plurality of threads, said shared resource mechanism comprising:
   (a) a dispatch stage of said pipeline processor;
   (b) at least one shared resource queue connected to the dispatch stage;
   (c) dispatch control logic connected to the dispatch stage and to the at least one shared resource queue; and
   (d) an issue queue of said pipeline processor connected to said dispatch stage and to the at least one shared resource queue;
   wherein the at least one shared resource queue allocates and deallocates resources for at least two of said plurality of threads passing into said issue queue in response to the dispatch control logic and the at least one shared resource queue further comprises a plurality of entries allocated to one thread and capable of being interspersed among another plurality of entries allocated to another of the plurality of threads wherein a bank number records the number of times a first entry of one thread wraps around a last entry of the same thread to access an available entry for allocating resources of the one thread.

9. An apparatus to enhance processor efficiency, comprising:
   (a) means to fetch instructions from a plurality of threads into a hardware multithreaded pipeline processor;
   (b) means to distinguish said instructions into one of a plurality of threads;
   (c) means to decode said instructions;
   (d) means to allocate a plurality of entries in at least one shared resource between at least two of the plurality of threads simultaneously executing;
   (e) means to allocate and intersperse entries in the at least one shared resource to one thread among entries allocated to other threads;
   (f) means for a first entry of one thread to wrap around a last entry of the same thread;
   (g) means to indicate the number of times the first entry of the one thread wraps around the last entry of the same thread;
   (h) means to determine if said instructions have sufficient private resources and at least one shared resource queue for dispatching said instructions;
   (i) means to dispatch said instructions;
   (j) means to deallocate said entries in said at least one shared resource when one of said at least two threads are dispatched;
   (k) means to execute said instructions and said resources for the one of said at least two threads.

10. The apparatus of claim 9, further comprising:
    (a) means to flush the at least one shared resource of all of said entries pertaining to the one of said at least two threads.

11. A computer processing system, comprising:
    (a) a central processing unit;
    (b) a semiconductor memory unit attached to said central processing unit;
    (c) at least one memory drive capable of having removable memory;
    (d) a keyboard/pointing device controller attached to said central processing unit for attachment to a keyboard and/or a pointing device for a user to interact with said computer processing system;
    (e) a plurality of adapters connected to said central processing unit to connect to at least one input/output device for purposes of communicating with other computers, networks, peripheral devices, and display devices;
    (f) a hardware multithreading pipelined processor within said central processing unit to simultaneously process at least two independent threads of execution, said pipelined processor comprising a fetch stage, a decode stage, and a dispatch stage; and
    (g) at least one shared resource queue within said central processing unit, said shared resource queue having a plurality of entries pertaining to more than one thread in which entries pertaining to different threads are interspersed among each other, and a head pointer pertaining to an entry of one thread is capable of wrapping around a tail pointer pertaining to another entry of the same one thread to access an available entry and the number of times the head pointer wraps around the tail pointer is recorded.

12. The computer processor of claim 11, wherein the hardware multithreaded pipelined processor in the central processing unit is an out-of-order processor.

* * * * *